United States Patent
Amano et al.

(10) Patent No.: US 9,262,447 B2
(45) Date of Patent: Feb. 16, 2016

(54) GENERATING RDF EXPRESSION TECHNICAL FIELD

(71) Applicant: International Business Machines Corporation, Armonk, NY (US)

(72) Inventors: Shunichi Amano, Kanagawa (JP); Hisashi Miyashita, Kanagawa-ken (JP); Hiroaki Nakamura, Kanagawa-ken (JP); Hideki Tai, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 13/850,356

(22) Filed: Mar. 26, 2013

(65) Prior Publication Data

US 2013/0268566 A1 Oct. 10, 2013

(30) Foreign Application Priority Data

Apr. 10, 2012 (JP) .................................. 2012-089261

(51) Int. Cl.
*G06F 17/30* (2006.01)

(52) U.S. Cl.
CPC ................................. *G06F 17/30289* (2013.01)

(58) Field of Classification Search
CPC .................... G06F 17/30286; G06F 17/30595; G06F 17/30569
USPC .......................................... 707/803, 809, 812
See application file for complete search history.

(56) References Cited

U.S. PATENT DOCUMENTS

| 2002/0174279 | A1* | 11/2002 | Wynne | ............... H04L 12/5693 710/113 |
| 2009/0043778 | A1* | 2/2009 | Jambunathan et al. | ......... 707/10 |
| 2010/0011168 | A1* | 1/2010 | Ryu | .................... G06F 12/0804 711/135 |

FOREIGN PATENT DOCUMENTS

| JP | 2005-242934 A | 9/2005 |
| JP | 2006-302085 A | 11/2006 |

OTHER PUBLICATIONS

Auer et al, "Triplify—Light-Weight Linked Data Publication from Relational Databases", ACM 978-1-60558-487, Apr. 20-24, 2009, 10 pages.*
Bizer et al., Lined Data—The Story So Far, International Journal on Semantic Web and Information Systems, 5 (3), 2009.
Open Services for Lifecycle Collaboration (OSLC), http://open-services.net/.
Auer, et al., Universität Leipzig, Triplify—Light-Weight Linked Data Publication from Relational Databses, WWW 2009, Apr. 20-24, 2009, Madrid, Spain.

* cited by examiner

*Primary Examiner* — Rehana Perveen
*Assistant Examiner* — Loc Tran
(74) *Attorney, Agent, or Firm* — Cahn & Samuels, LLP

(57) ABSTRACT

A set of ID for data of an existing tool is created as a parameter. A bulk access template that acquires a plurality of data is prepared. Access is provided to an existing tool path through the bulk access template. The bulk access template is prepared for each type of data that is acquired. The template is instantiated based on the URI that is requested. Entries that correspond to the operating table are filled in by executing the bulk access template that was created. When an RDF expression is requested for the URI of the template that is the same as one previously accessed, the entries would already be in the operating table, so that the RDF expression can be generated without accessing the existing tool.

9 Claims, 9 Drawing Sheets

| | (URI, access template) | Acquired data |
|---|---|---|
| 1 | (http://example.com/Req/3,getReqs) | Id=3, title=shaft<br>rev=http://example.com/ReqRev/4 |
| 2 | (http://example.com/ReqRev/8,getReqRevs) | |
| 3 | (http://example.com/Req/6,getReqs) | Id=6, title=gear,<br>rev=http://example.com/ReqRev/9 |

FIG. 4

|   | Type | Path element name | Attribute name set | Template |
|---|---|---|---|---|
| 1 | Person | Person | Requirement.owner<br>RequirementRevision.owner | getPersons |
| 2 | Requirement | Req | RequirementRevision.items_tag | getReqs |
| 3 | RequirementRevision | ReqRev | Requirement.rev<br>RequirementRevision.rev | getReqRevs |

|   | (URI, access template) | Acquired data |
|---|---|---|
| 1 | (http://example.com/Req/3,getReqs) | Id=3, title=shaft<br>rev=http://example.com/ReqRev/4 |
| 2 | (http://example.com/ReqRev/8,getReqRevs) |  |
| 3 | (http://example.com/Req/6,getReqs) | Id=6, title=gear,<br>rev=http://example.com/ReqRev/9 |

306

GENERATING RDF EXPRESSION

TECHNICAL FIELD

CROSS-REFERENCE TO RELATED APPLICATION

This application claims priority under 35 U.S.C. §119 from Japanese Patent Application No. 2012-089261 filed Apr. 10, 2012, the entire contents of which are incorporated herein by reference.

BACKGROUND OF THE INVENTION

1. Field of the Invention

The present invention relates to a computer implemented method, program, and system for generating RDF expressions from predetermined data.

2. Description of Related Art

In recent years, RDF (Resource Description Framework) format has been used as a mechanism for describing resources on the web, as disclosed in Japanese Patent Application Publication 2005-242934 and Japanese Patent Application Publication 2006-302085. Furthermore, Bizer, Tom Heath, Tim Berners-Lee, Lined Data—The Story So Far, International Journal on Semantic Web and Information Systems, 5 (3), 2009, describes Linked Data where RDF format data is used in coordination on a web mechanism as a mechanism for global information disclosure. Also see, Open Services for Lifecycle Collaboration (OSLC), http://open-services.net/, for a description on using Linked Data for information coordination within an enterprise.

Tools that provide Linked Data include tools that store and provide RDF data, and tools that convert non-RDF data managed by existing tools to RDF and then provide RDF data.

Furthermore, tools that use Linked Data include tools that obtain data by traversing links based on a user request, and tools that crawl over tools that provide Linked Data beforehand and create an index in order to make data access more efficient.

FIG. 1 is a diagram illustrating an example of a configuration where a plurality of computers is connected by a network in order to use this type of tool. In other words, computers 104, 106, 108, 110, 112, 114, 116, and 118 are connected to a network 102 which is typically a LAN or WAN. Computer 104 and computer 110 store a tool that stores and provides RDF data.

Computer 106 and computer 112 store an existing tool. Herein, data that is handled by an existing tool refers to records that are stored in a relational database, application language objects that are accessed by the API of an existing tool, and structured data in XML, HTML, CSV.

Computer 108 and computer 114 store a tool that manages the existing tools on computer 106 and computer 112, and converts data that is not RDF to RDF and then provides, or in other words, stores a tool that converts and provides Linked Data.

Computer 116 stores a tool that obtains data by traversing links based on a user request. Computer 118 stores a tool that crawls over tools that provide Linked Data beforehand and creates an index.

With this configuration, each time computer 116 and computer 118 accesses the tool that converts and provides Linked Data on computer 108 and computer 114, the existing tool on computer 106 or computer 112 is accessed in order to return a response.

In particular, when the tool that crawls over tools that provide Linked Data beforehand and creates an index on computer 118 crawls over the tool that converts and provides Linked Data on computer 108 and computer 114, a plurality of accesses are concentrated in order to generate a response for the request. Therefore, access to the existing tool in order to respond to the requests from the crawler becomes a bottleneck, and there is a problem that the throughput of the entire system is reduced.

Soeren Auer, Sebastian Dietzold, Jens Lehmann, Sebastian Hellmann, David Aumueller, Universitaet Leipzig, Postfach Leipzig, Triplify—Light-Weight Linked Data Publication from Relational Databases, WWW 2009, describes technology that converts data of an existing database to RDF in accordance with a mapping designation. Using the technology described therein, a plurality of triples is simultaneously generated from the results of a single existing database query, thus preventing an increase in the number of accesses. However, access to the existing database always occurs when accessing the conversion tool, so the throughput of the entire system is not improved.

SUMMARY OF THE INVENTION

It is an object of the present invention to reduce accesses to an existing tool when accessing an existing tool and converting to RDF, and thereby improve processing speed.

The present invention achieves the aforementioned object by embodying a set of ID for the data of the existing tool as a parameter, preparing a bulk access template that acquires a plurality of data one time, or a few times at most, and making access to the existing tool path through the bulk access template. The bulk access template can be a parameterized template of an SQL Where clause, or can be achieved by combining with an API. The bulk access template is prepared for each type of data that will be acquired.

According to another aspect of the present invention, creation and control of data that will be provided to the template are performed using an operating table that is stored in the main memory of the computer. In other words, according to the present invention, URIs included in the RDF expression that are generated are deemed to have a high possibility of being subsequently accessed, and these individual URI are registered in the operating table along with the template name that acquires the data for generating the corresponding RDF.

In the present invention, the template is instantiated based on the URI that is requested, and entries that correspond to the operating table are filled in by executing the template that was instantiated. Thereby, a corresponding RDF expression is obtained.

Subsequently, when an RDF expression is requested for the URI of the template that is the same as one previously accessed, the entries are already in the operating table, so the RDF expression can be generated without accessing the existing tool.

In this manner, with the present invention, the existing tool is accessed through a bulk access template, and therefore entry of data for a template of a certain URI is registered once in the operating table, so subsequent access to the existing tool will not occur when an RDF expression is requested for the URI related to the same template, and thus the frequency of access can be reduced.

BRIEF DESCRIPTION OF THE DRAWINGS

FIG. 4 is a diagram illustrating a correspondence table.

FIG. 5 is a diagram illustrating an operating table.

DETAILED DESCRIPTION OF THE PREFERRED EMBODIMENTS

Examples of the present invention are described below using the drawings. These examples are for describing a preferred embodiment of the present invention, and it should be understood that there is no intent to restrict the scope of the invention to the examples described herein. Furthermore, in the following diagrams, the same symbols are used to indicate the same subjects unless otherwise specified.

Figure 1:
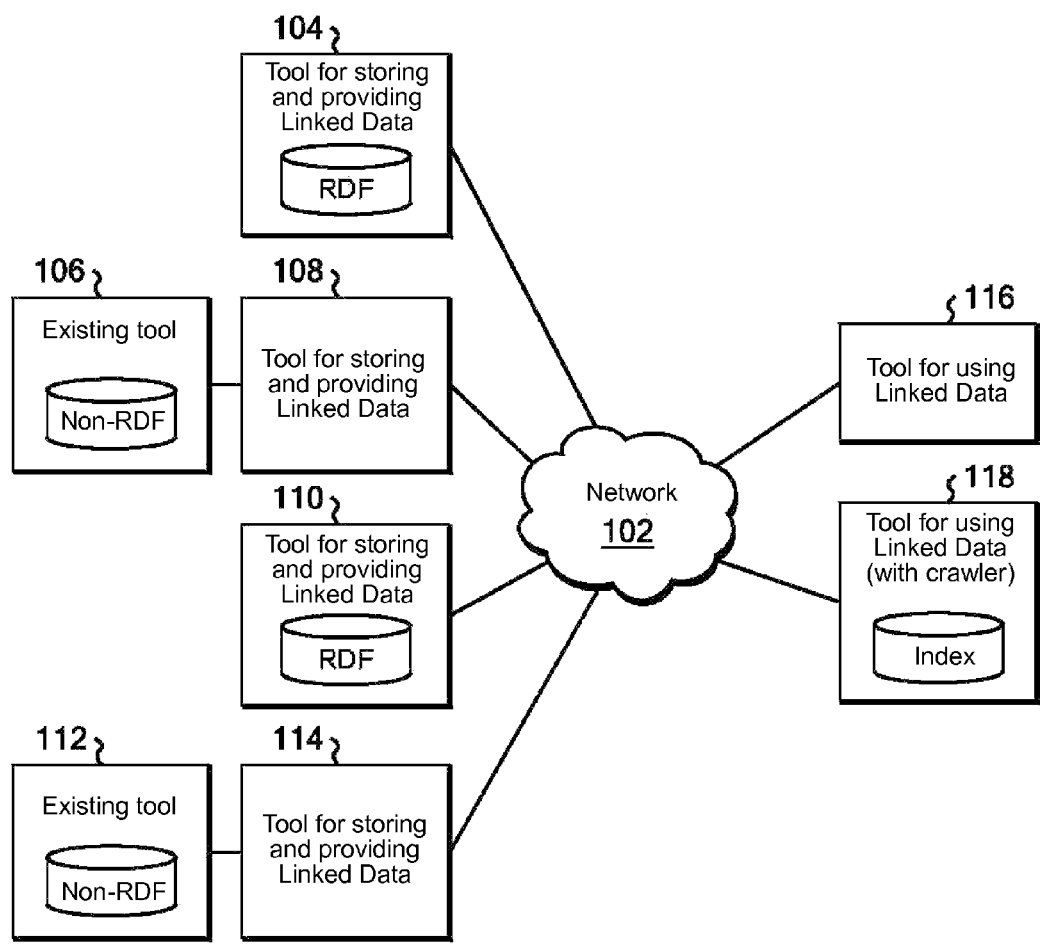
FIG. 1 is a schematic diagram of a system configuration containing a plurality of computers connected by a network that includes a tool that converts and provides Linked Data, and a tool that uses Linked Data.
Figure 2:
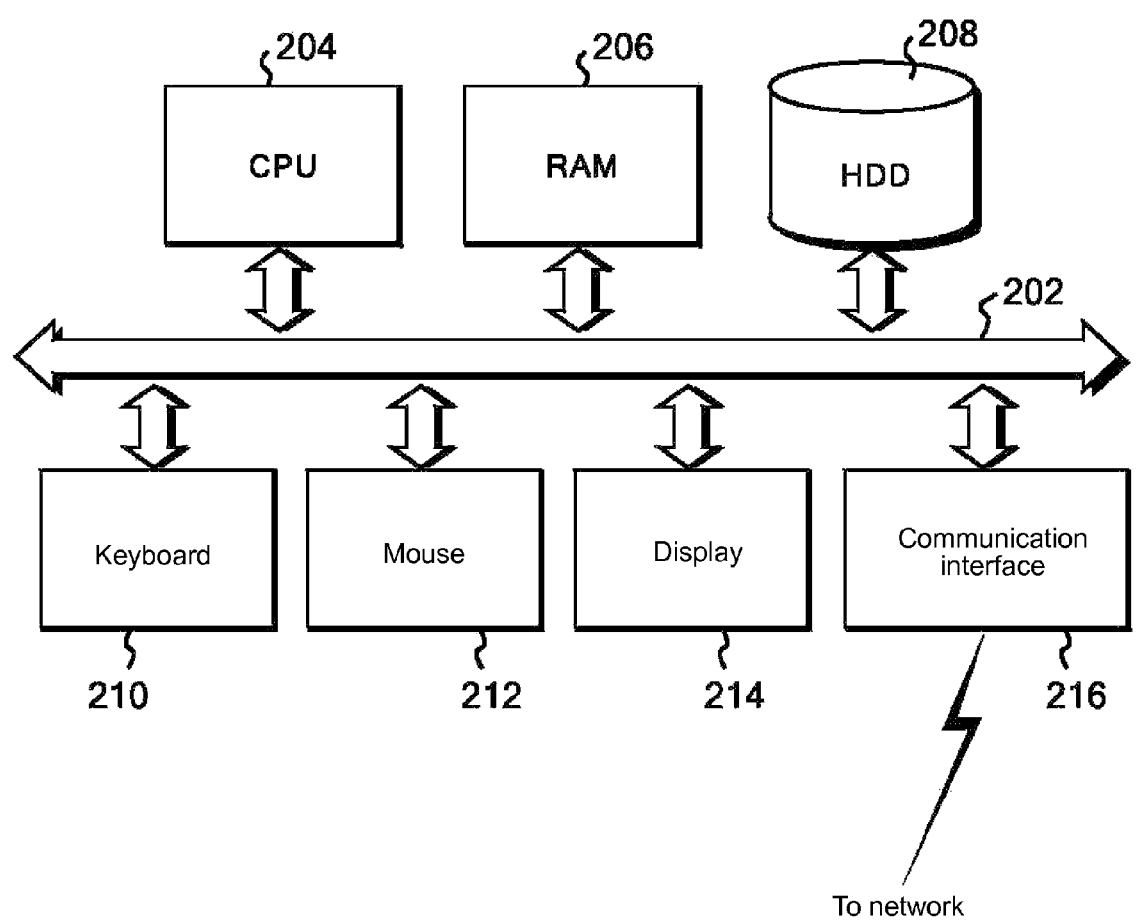
FIG. 2 is a diagram illustrating a block diagram of the hardware of the computer that stores the tool for converting and providing Linked Data.

The present invention relates to an improvement for a tool that converts and provides Linked Data, with a configuration as illustrated in FIG. 1. FIG. 2 illustrates a block diagram of exemplary hardware for computers 108 and 114 that store the tool that converts and provides Linked Data in FIG. 1. Note, the hardware configuration illustrated in FIG. 2 can be used not only for computers 108 and 114, but also for computers 104, 106, 110, 112, 116, and 118.

In FIG. 2, system bus 202 is connected to CPU 204, main memory (RAM) 206, hard disk drive (HDD) 208, keyboard 210, mouse 212, and display 214. CPU 204 is preferably based on 32-bit or 64-bit architecture, and examples that can be used include Intel's Pentium™ 4, Intel's Core™ 2 DUO, and AMD's Athlon™ and the like. Main memory 206 preferably has a capacity of 4 GB or higher, more preferably a capacity of 8 GB or higher.

Hard disk drive 208 stores an operating system. The operating system can be any system that is compatible with CPU 204, such as Linux™, Microsoft Windows™ 7, Windows XP™, Windows™ 2003 server, and Apple computers Mac OS™ and the like.

Figure 3:
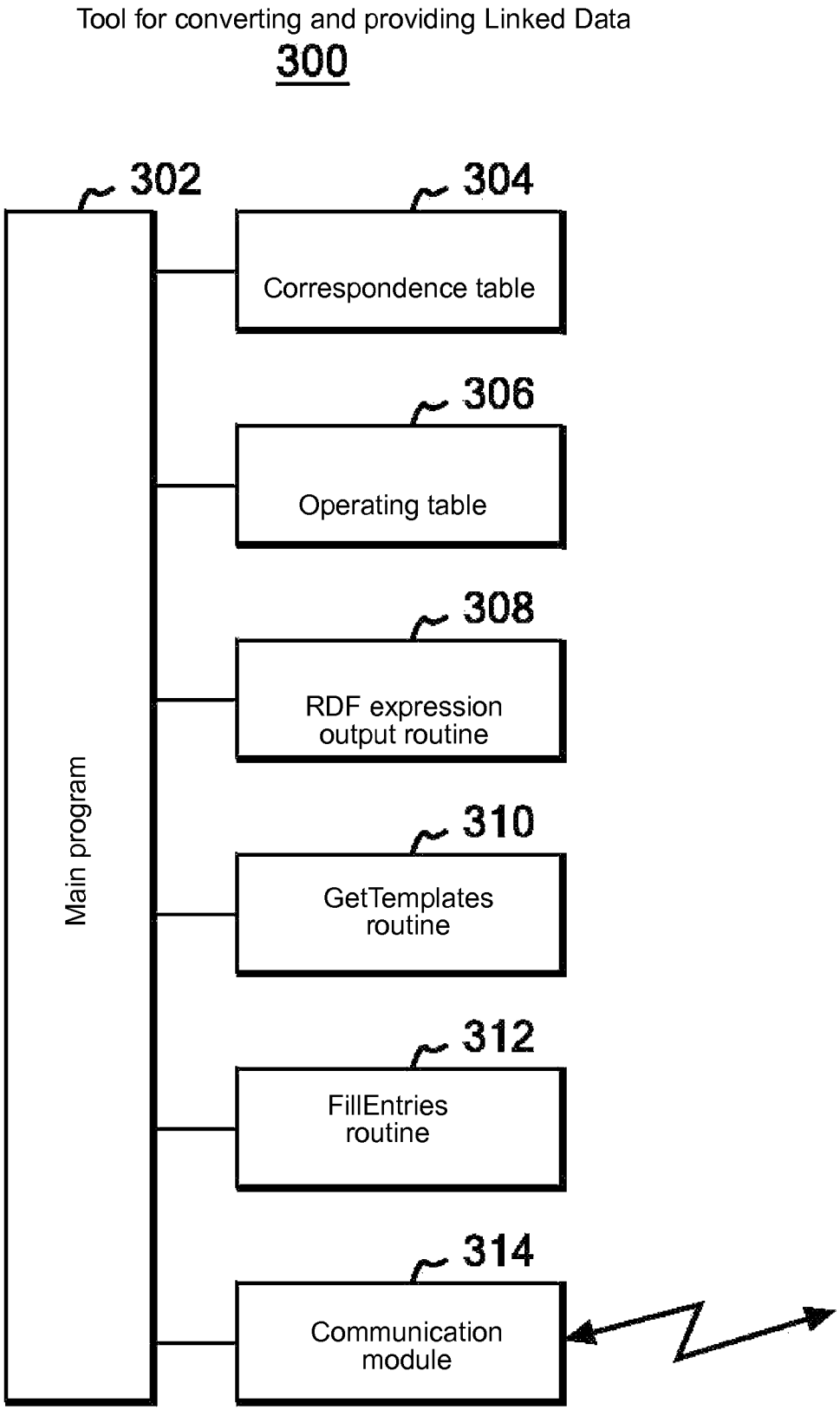
FIG. 3 is a diagram illustrating a functional block diagram of the tool that converts and provides Linked Data according to the present invention.

As shown in FIG. 3, hard disk drive 208 also stores main program 302, RDF expression output routine 308, GetTemplate routine 310, FillEntries routine 302, and the like, which are elements of tool 300 for converting and providing the Linked Data. These routines and programs can be created using a compiler that can generate executable code that is compatible with CPU 204 using an existing programming language processing system such as C, C++, Java®, and the like.

Keyboard 210 and mouse 212 are used for operating graphic objects such as icons, task bars, text boxes, and the like that are displayed on display 214 in accordance with the graphic user interface provided by the operating system.

Although not a limitation, display 214 preferably has a resolution of 2024×768 or higher, and is a 32-bit true color LCD monitor. Display 214 is used for displaying a screen that operates the RDF conversion tool for example.

In a preferred embodiment of the present invention, communication interface 216 is connected to a network using Ethernet® protocol. Communication interface 216 receives requests from computer 116 that stores the tool that uses the Linked Data and computer 118 that stores the tool that uses Linked Data with a crawler, and is used for accessing computer 112 that stores the existing tool, and the like.

The tool that uses Linked Data allows the user or third-party tool to access information by repeatedly performing a series of operations. These operations include acquiring the RDF expression from the tool that provides Linked Data, analyzing the data acquired and submitting to the user or third-party tool, and requesting the URI included in the submitted data that has been specified by the user or third-party tool. For example, the tool is used as a mechanism for searching newspaper articles by name, location, category, or the like, for managing processes, design, code, test, and changes in software development, and for managing medical information, test data, and market information for drugs, and the like.

The tool that uses Linked Data with a crawler automatically repeats operations that follow a URI included in an RDF expression and collects other RDF, for the purpose of creating an index for searching, statistical surveys, and creating lists and the like. Accordingly, the tool differs from a tool that simply uses Linked Data in that 1) a large number of accesses occur in a fixed period of time, and 2) data that has been accessed once will seldom be accessed after that.

Next, each of the functional elements of tool 300 that converts and provides Linked Data is described while referring to the functional block diagram of FIG. 3.

In FIG. 3, main program 302 has a function that initiates and terminates tool 300 that converts and provides Linked Data, by the operation of keyboard 210 or mouse 212.

Correspondence table 304 is a table of data including type, path elements, attribute name sets, and templates. Correspondence table 304 is stored beforehand on hard disk drive 208 by the operator of tool 300 that converts and provides Linked Data, and is preferably loaded into main memory 206 at startup.

Herein, the template is the name of a subroutine that has been created beforehand, and the SQL and API of the existing tool are called up in this subroutine.

As illustrated in FIG. 5, operating table 306 has a field for the pair (URI, access template) as well as data that has been acquired. Operating table 306 preferably arranges entries in regions of the memory that have been acquisitions in main memory 206, and although the detailed process is described later, this size is adjusted by adding entries or releasing memory regions by deleting entries.

RDF expression output routine 308 responds to a URI received from the tool that uses Linked Data or the tool that uses Linked Data with a crawler through communication module 314, accesses the existing tool through communication module 314, converts to an RDF expression, and transmits the data for the RDF expression to the tool that uses Linked Data or the tool that uses Linked Data with a crawler through communication module 314. The detailed process of RDF expression routine 308 is described later while referring to the flowchart of FIG. 6.

GetTemplates routine 310 is called up by RDF expression routine 308 and performs processes that prepare for a template set. The detailed process of GetTemplates routine 310 is described later while referring to the flowchart of FIG. 7.

FillEntries routine 312 is called up by RDF expression output routine 308 and performs processes that fill-in the fields of operating table 306. The detailed process of FillEntries routine 312 is described later while referring to the flowchart of FIG. 8.

Communication module 314 is used in order for RDF expression output routine 308 to communicate with computer 116 that stores the tool that uses Linked Data and computer 118 that stores the tool that uses Linked Data with a crawler, using communication interface 216. Communication module 314 can use a communication function that is provided as a standard in operating systems.

Figure 6:
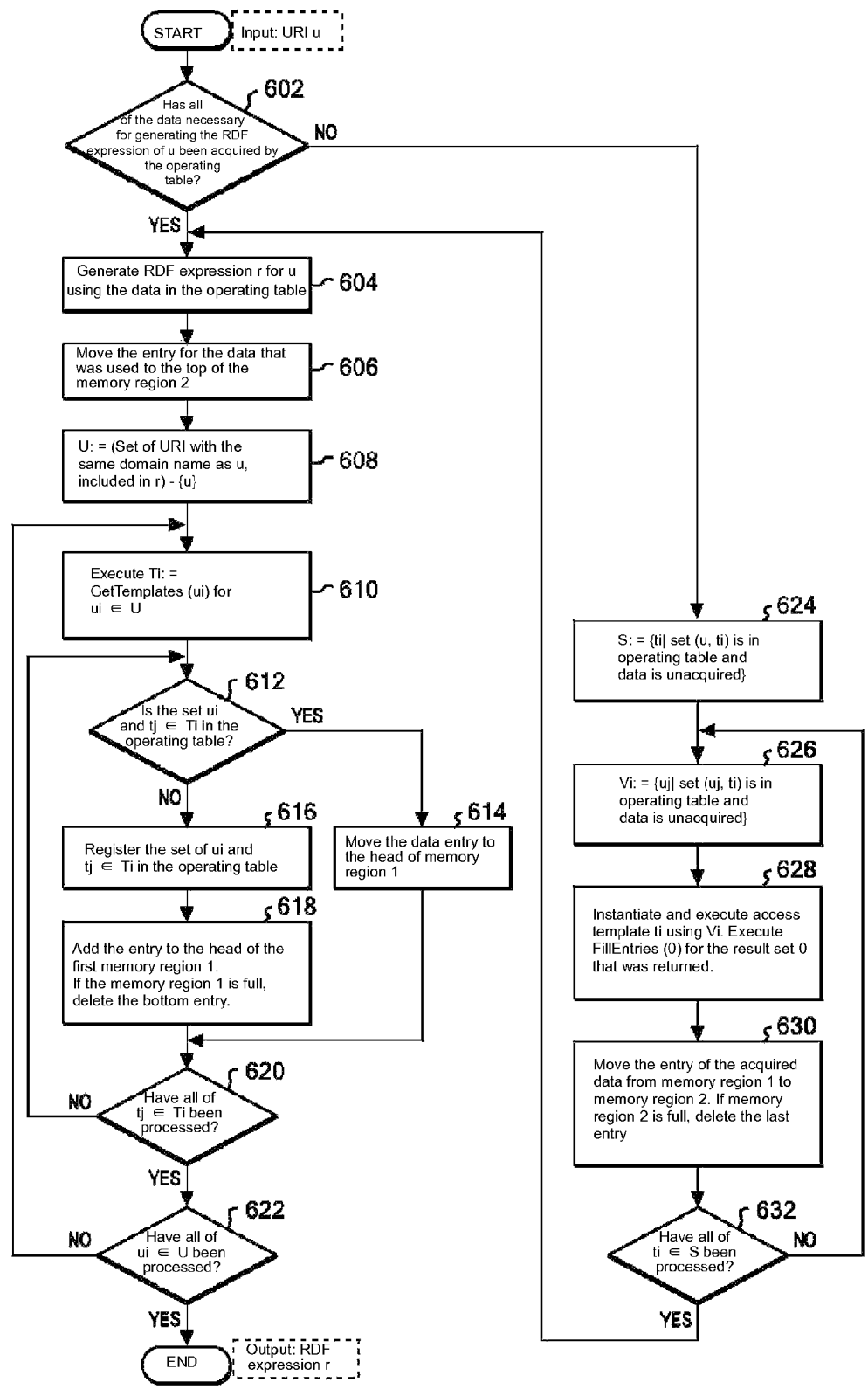
FIG. 6 is a diagram illustrating a flowchart for an RDF expression output process.

Next, the process of RDF expression routine 308 is described while referring to the flowchart of FIG. 6. RDF expression output routine 308 inputs URI u.

In step 602 of FIG. 6, RDF expression routine 308 determines whether or not all of the data required for generating the RDF expression of u has been acquired by the operating table 306. If so, the acquired data in operating table 306 is used to generate the RDF expression r of u in step 604. In the example shown in FIG. 5, http://example.com/RedRev/4 is the RDF expression of u.

In step 606, RDF expression output routine 308 moves the data entry that was used to the top of memory region 2. Herein, memory region 1 for managing unacquired data and memory region 2 for managing acquired data are described while referring to FIG. 10. Memory region 1 and memory region 2 are regions of allocated memory in main memory 206, and call up a predetermined API function of the operating system for example. Operating table 306 includes the combined regions of memory region 1 and memory region 2.

The reason that operating table 306 includes memory region 1 and memory region 2 is that operating table 306 must manage data that is stored in a fixed size. Acquired data has the following characteristics.

First, the application that uses the data accesses the crawled data. The crawler has a low possibility of reacquiring data that has once been acquired. It is conceivable that entry of the unacquired data that is added to operating table 306 will have a lower possibility of being acquired over time. When the application references the indexed data after crawling, the access has locality.

Figure 10:
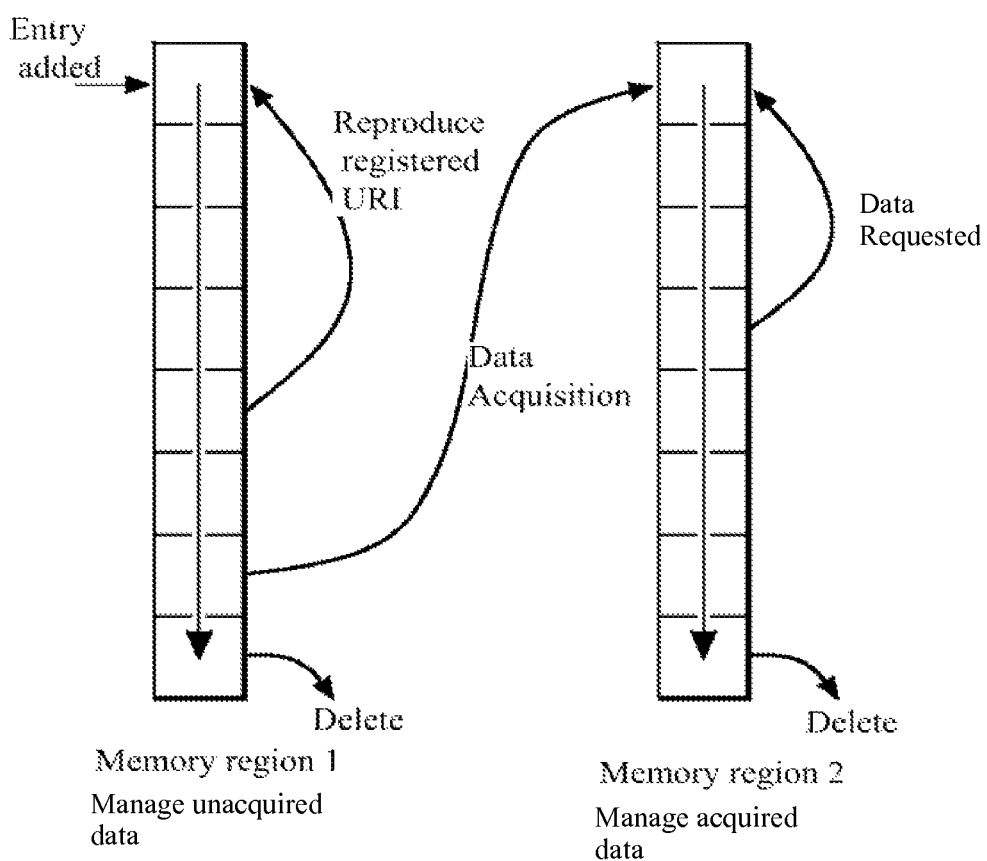
FIG. 10 is a diagram illustrating the process of memory regions that form the operating table.

Therefore, the data is managed using two memory regions, namely memory region 1 and memory region 2. Memory region 1 manages unacquired data entry in a queue. Entry addition is performed at the head of the queue. As illustrated in FIG. 10, wherein the entry data is acquired, the data is transferred to memory region 2. When a registered URI reappears, the URI is returned to the head of the queue. When the queue is full the last entry is removed. Memory region 2 also manages acquired data entry in a queue. Entry addition due to data acquisition is performed at the head of the queue. When the entry data is requested, the data is returned to the head of the queue. The queue is limited to a certain size that depends on the capacity of main memory 206 that can be used, and when the queue is full, the bottom entry is deleted. This process is performed by RDF expression output routine 308.

Returning to the flowchart of FIG. 6, in step 608 that follows step 606, RDF expression output routine 308 is U:= (set of URI included in r that have the same domain name as u)—{u}.

In step 610, RDF expression output routine 308 executes Ti:=GetTemplates (ui) with regards to ui U, and obtains a template set Ti with regards to ui. The process of GetTemplates ( ) is described later while referencing the flowchart of FIG. 7.

In step 612, RDF expression output routine 308 determines whether or not the pair of ui and tj Ti is in operating table 360.

If so, the data entry is moved to the head of memory region 1 in step 614, and then the process moves to step 620.

If it is determined that the set ui and tj Ti is not in operating table 360, RDF expression output routine 308 registers the pair of ui and tj Ti in operating table 306 in step 616, and adds the entry to the head of memory region 1 in step 618. At this time, if memory region 1 is full, the bottom entry is deleted and the process moves to step 620.

In step 620, RDF expression output routine 308 determines whether or not all of tj Ti have been processed, and if so, the processed tj is removed, and the process proceeds to step 612.

If it is determined in step 620 that all of tj Ti has been processed, RDF expression output routine 308 determines whether or not all of ui U have been processed in step 622, and if so, the process is terminated. Otherwise, the processed ui are removed and the process returns to step 610.

After returning to step 602, if it is determined that the data required for generating the RDF expression of u has not been acquired in operating table 306, RDF expression output routine 308 will, in step 624, create set S where S:={ti| set (u, ti)} is unacquired data in operating table 306.

Next, in step 626, RDF expression output routine 308 creates set Vi, where Vi={uj| set (uj, ti)} where ti S is unacquired data in operating table 306.

Next, in step 628, RDF expression output routine 308 instantiates and executes an access template ti using Vi. Herein, instantiating an access template means providing the following access template.
SELECT id, title, assembly
FROM part
WHERE [PARAMETERS]
wherein [PARAMETERS] is substituted with id in Vi. Alternatively if Vi={ni, n2}, [PARAMETERS] can be id=ni or id=n2

Furthermore, FillEntries (0) is executed for result set 0 that is returned as the result of this query. The process of FillEntries ( ) is described later while referencing the flowchart of FIG. 7.

In step 630, RDF expression output routine 308 then moves the data entry from memory region 1 to the top of the memory region 2. When the memory region 2 is full, the last entry is removed.

In step 632, RDF expression output routine 308 determines whether or not all of ti S have been processed. If so, the process moves to step 604, and if not, ti is returned to step 626 as processed.

Figure 7:
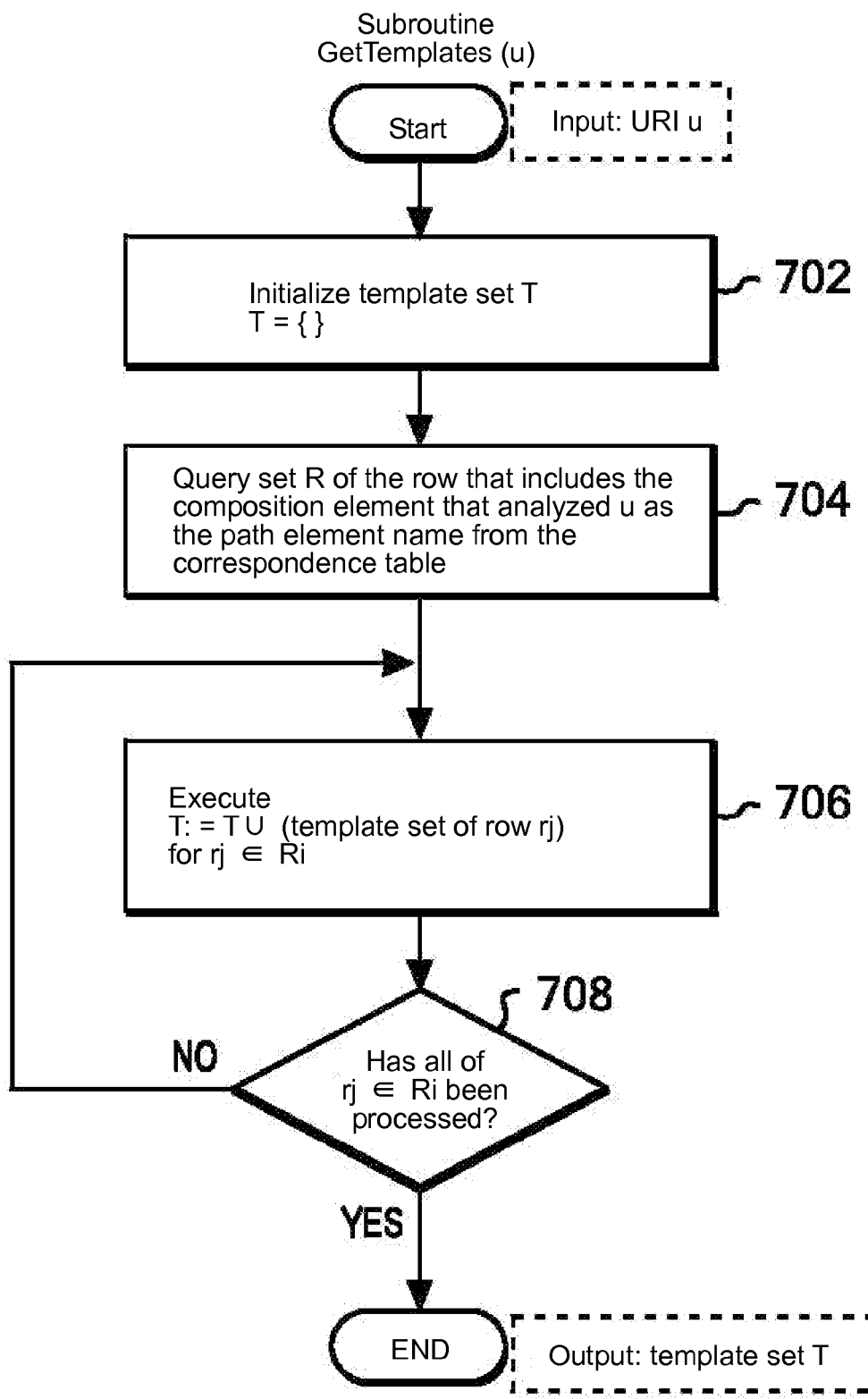
FIG. 7 is a diagram illustrating a flowchart for a subroutine GetTemplates process.

Next, the process of subroutine GetTemplates (u) is described while referring to the flowchart of FIG. 7. The subroutine GetTemplates input is URI u.

In step 702, GetTemplates initializes the template set T using T={ }.

In step 704, GetTemplates searches set R that includes component elements fragmented from u as path element names from correspondence table 304.

In step 706, GetTemplates executes T:=T (template set of row rj) with regards to rj Ri.

In step 708, GetTemplates determines whether or not all of rj Ri have been processed. If so, the process is terminated, and if not, rj is returned to step 706 as processed.

Figure 8:
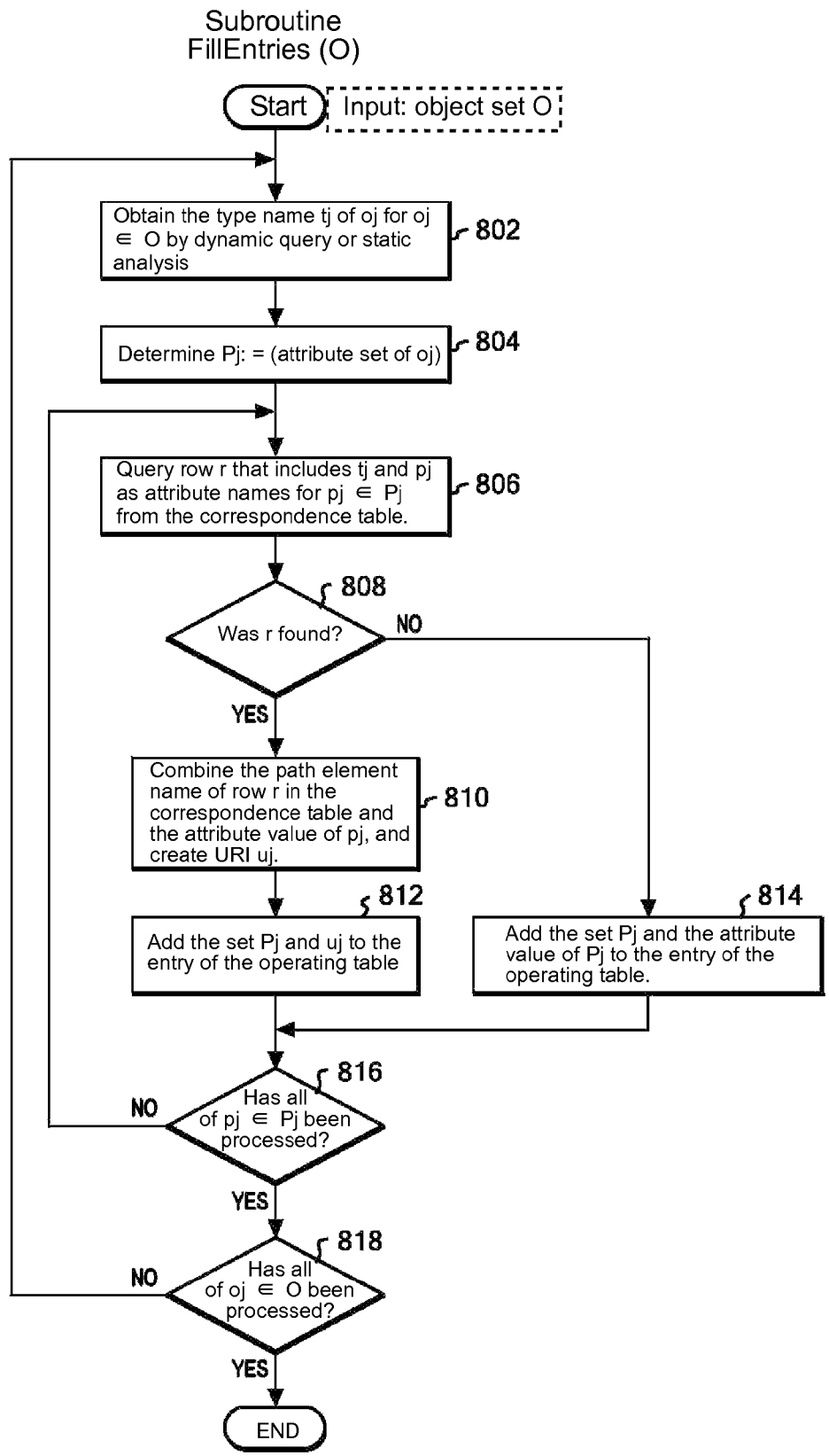
FIG. 8 is a diagram illustrating a flowchart for a subroutine FillEntries process.

Next, the process of subroutine FillEntries (0) is described while referring to the flowchart of FIG. 8. The subroutine FillEntries input is the object set 0.

In step 802, FillEntries obtains the type name tj of oj with regards to oj O, either by dynamic or static searching. Herein, dynamic searching obtains a type name during execution by calling up a method such as o.getType( ) with regards to object o. Furthermore, with static searching, the type name of the object set returned by the access template is determined by analyzing the API beforehand, and when FillEntries (0) is called up, the type name of O is already known and will be used. The method for accessing the type name in FillEntries (0) is to assign the type name to a global variable when the access template is used, and then referencing this to add the type name as an argument to FillEntries (0) and then transferring or the like.

In step 804, FillEntries determines Pj:=(attribute set of oj).

In step 806, FillEntries queries the row r that includes tj, pj as attribute names from correspondence table 304 with regards to pj Pj.

In step 808, FillEntries determines whether or not r has been found. Furthermore, if r has been found, the path element name of row r of correspondence table 304 is combined with the attribute value of pj, and URI uj is created in step 810, the set of Pj and uj are added to the entry of operating table 306 in step 812, and then the process moves to step 816.

If it is determined that r was not found in step 808, FillEntries adds the set of Pj and the attribute value of Pj to the entry of operating table 306 in step 814, and then the process moves to step 816.

In step 816, FillEntries determines whether or not all of pj Pj have been processed. If so, the process proceeds to step 818, and if not, pj is returned to step 806 as processed.

In step 818, FillEntries determines whether or not all of oj O have been processed. If so, the process is terminated, and if not, oj is returned to step 802 as processed.

Figure 9:
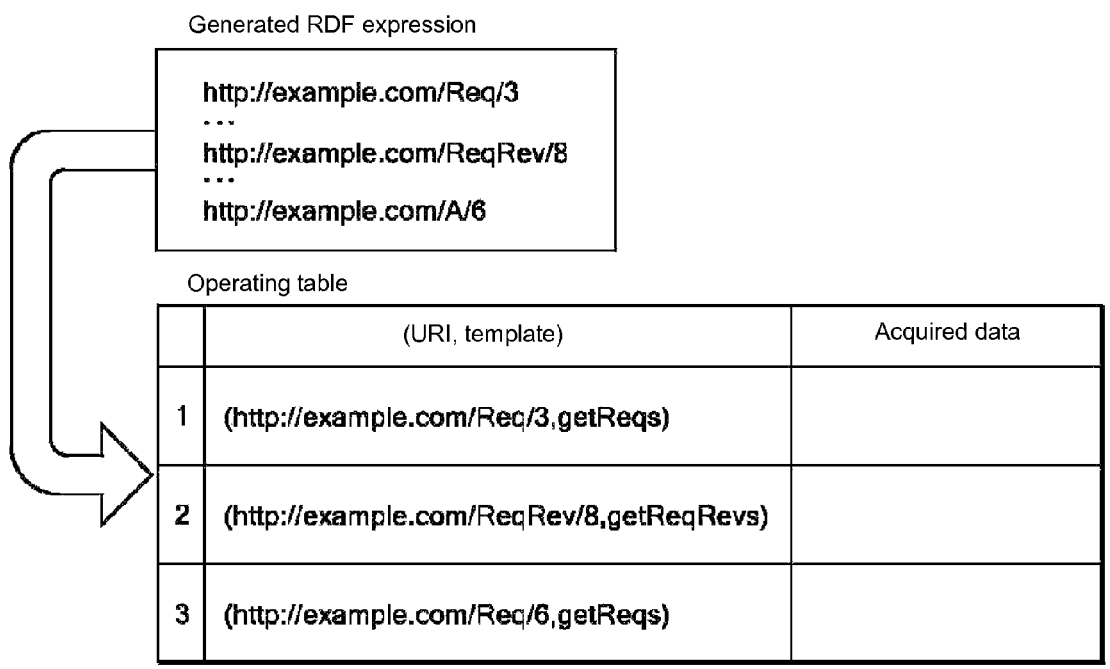
FIG. 9 is a diagram illustrating an example of data stored in the operating table in accordance with an RDF expression output process.

Next, an example of the function of RDF expression output routine 308 is described while referring to FIG. 9. RDF expression output routine 308 uses operating table 306 to control creation and execution of the data provided to the template. This is based on the observation that the URI that is included in the RDF expression that is generated has a high possibility of subsequently being accessed. Therefore, RDF expression output routine 308 registers each of these URI in operating table 306 along with the template name for acquiring the data for generating the corresponding RDF. The template that corresponds to the URI is determined by the aforementioned GetTemplates.

As illustrated in FIG. 9(a), an entry corresponding to the RDF expression that was generated is stored in the (URI, template) field of operating table 306.

Herein, it is assumed that http://example.com/Req/3 has been requested. The data for expressing the RDF of this URI has not been acquired. At this time, row 3 is the row in operating table 306 that includes the same template as row 1 that includes http:///example.com/Req/3. Therefore, when the template is instantiated and executed using the value {3, 6} obtained from the URI of row 1 and row 3 as the parameters, the results are as shown below.
The template is instantiated such that:
SELECT id, title, assembly
FROM part
WHERE [PARAMETERS]
wherein
[PARAMETERS]→id={3, 6}, and
SELECT id, title, assembly
FROM part
WHERE id=3 or id=6

In this manner, the data of row 1 and row 3 (id equals 3 and id equals 6) can be simultaneously obtained by executing one time. As illustrated in FIG. 9(b), the results are recorded in row 1 and row 3 by executing FillEntries with regards to the data obtained.

The data of row 1 has been obtained, so RDF expression output routine 308 uses these results to generate the RDF expression http://example.com/Req/3. Furthermore, the URI that is included in the RDF expression that was generated is registered in the operating table. Thereafter, when http://example.com/Req/3 is subsequently requested, the necessary data has been acquired in operating table 306, so the RDF expression can be generated without accessing the existing tool.

The process details of GetTemplates and FillEntries are as described below.

Subroutine GetTemplates: The template set T is requested from URI u, or in other words:
1. u is received (for example: http://example.com/Req/3).
2. u is analyzed and the path element name is obtained as a component element (example: Req).
3. The row that includes the path element name is queried from the correspondence table (example: {row 2}).
4. The sum of the template name set of each row is determined and returned (example: {getReqs}).

Subroutine FillEntries: The object set O is recorded in the operating table, or in other words:
1. One element of object set O is designated as o.
2. The type name of o is determined (example: Requirement).
3. The attribute set of o is determined (example: {id=3, title=shaft, rev=4}).
4. The row that includes the type name of o and the attribute name that combines each of the attributes is queried from the correspondence table (example: row 3 including Requirement, rev 3).
5. If the row is found, a URI is generated from the path element name and attribute values of the row, and the set of the attribute name and the generated URI are registered in the operating table (example: the URI http://example.com/ReqRev/4 is generated from the path element name ReqRev and the attribute value 4 of row 3, and rev=http://example.com/ReqRev/4 is registered).
6. If the row is not found, the set of the attribute name and the attribute value are registered in the operating table (example: title=shaft is registered).
7. Steps 4 through 6 are repeated for all of the attributes of o.
8. Steps 1 through 7 are repeated for all of the elements of O.

The present invention was described above using a specific embodiment, but the present invention is not restricted to a specific operating system or platform, and one skilled in the art will understand that the present invention can be achieved on any computer system.

Furthermore, the existing tool accessed by the tool that converts and provides Linked Data is not restricted to relational database records, and any data that can be converted to RDF is acceptable. If relational database records are not used, the data is accessed by the predetermined API rather than SQL.

The invention claimed is:

1. A computer implemented method for creating RDF expressions for records of a query, the method comprising the steps of:
referencing a correspondence table containing at least a path element name and a corresponding template name of a template for generating a URI of the RDF expression;
receiving the URI for creating a corresponding RDF expression;
analyzing the URI that was received and obtaining the path element name;
storing in an operating table a combination of the URI that was received, the path element name, and the template name corresponding to the path element name that was obtained by referencing the correspondence table, wherein the operating table is a region that is reserved in main memory, wherein the operating table includes a first memory region that provides a queue for managing unacquired data and a second memory region that provides a queue for managing acquired data;

generating a URI based on a set of the URI and a template name for each entry by responding to the receipt of the URI for creating corresponding RDF expressions where a plurality of entries are stacked in rows of the operating table;

analyzing the URI that was received and obtaining a path element name;

requesting entry with the same template name from the operating table;

executing the template that was instantiated;

successively acquiring a plurality of entries with the path element name from the execution results;

moving an entry of the operating table that was acquired from the first memory region to the head of the second memory region; and responding to the number of entries exceeding a predetermined limit in the first memory region and the second memory region by deleting the bottom entry in the queue, wherein at least one of the steps is carried out using a computer device so that RDF expressions for records of a query are created.

2. A method according to claim 1, wherein execution of the template includes accessing non-RDF existing data.

3. A method according to claim 2, wherein the non-RDF existing data includes a relational database, and execution of the template includes comparing by SQL formulas.

4. A computer program product for creating RDF expressions for records of a query, the computer program product comprising a non-transitory computer readable storage medium having a program code embodied therein, the program code causing the computer to execute the steps of:

reference a correspondence table containing at least a path element name and a corresponding template name of a template for generating a URI of the RDF expression;

receive the URI for creating the corresponding RDF expression;

analyze the URI that was received and obtaining the path element name;

store in an operating table a combination of the URI that was received, the path element name, and the template name corresponding to the path element name that was obtained by referencing the correspondence table, wherein the operating table is a region that is reserved in the main memory, wherein the operating table includes a first memory region that provides a queue for managing unacquired data and a second memory region that provides a queue for managing acquired data;

generate a URI based on the set of the URI and the template name for each entry by responding to the receipt of the URI for creating corresponding RDF expressions were a plurality of entries are stacked in rows of the operating table;

analyzing the URI that was received and obtaining a path element name;

requesting entry with the same template name from the operating table;

executing the template that was instantiated; and successively acquiring a plurality of entries with the path element name from the execution results;

moving an entry of the operating table that was acquired from the first memory region to the head of the second memory region; and responding to the number of entries exceeding a predetermined limit in the first memory region and the second memory region by deleting the bottom entry in the queue.

5. A computer program product according to claim 4, wherein execution of the template includes accessing non-RDF existing data.

6. A computer program product according to claim 5, wherein the non-RDF existing data includes a relational database, and execution of the template includes comparing by SQL formulas.

7. A system for creating RDF expressions for records of query processing, the system comprising:

main memory;

recording means;

a correspondence table containing at least a path element name and a corresponding template name of a template for generating a URI of an RDF expression, stored on the recording means;

a computer device to:

receive a URI for creating the corresponding RDF expression;

analyze the URI that was received and obtaining the path element name;

store in an operating table in the main memory a combination of the URI that was received, the path element name, and the template name corresponding to the path element name that was obtained by referencing the correspondence table, wherein the operating table includes a first memory region that provides a queue for managing unacquired data and a second memory region that provides a queue for managing acquired data;

generate a URI based on the set of the URI and the template name for each entry by responding to the receipt of the URI for creating corresponding RDF expressions were a plurality of entries are stacked in rows of the operating table;

analyze the URI that was received and obtaining the path element name;

request entry with the same template name from the operating table;

execute the template that was instantiated, and successively acquire a plurality of entries with the path element name from the execution results;

move an entry of the operating table that was acquired from the first memory region to the head of the second memory region; and respond to the number of entries exceeding a predetermined limit in the first memory region and the second memory region by deleting the bottom entry in the queue.

8. A system according to claim 7, wherein execution of the template includes accessing non-RDF existing data.

9. A system according to claim 8, wherein the non-RDF existing data includes a relational database, and execution of the template includes comparing by SQL formulas.

* * * * *